March 4, 1952      P. C. GREEN      2,587,838
SPLINE ADAPTER COUPLER
Filed Sept. 20, 1950
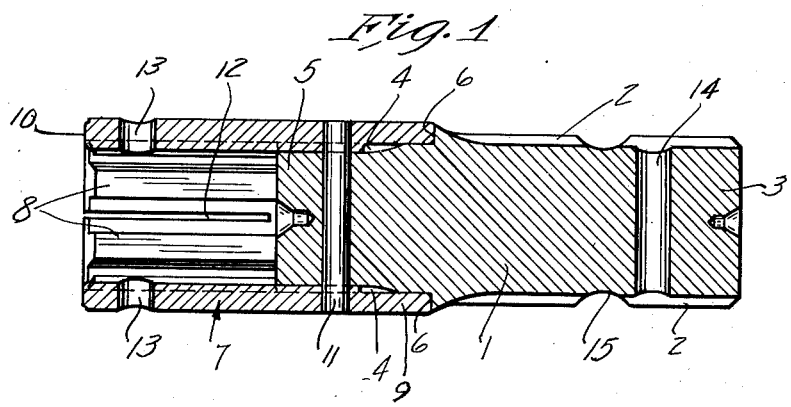
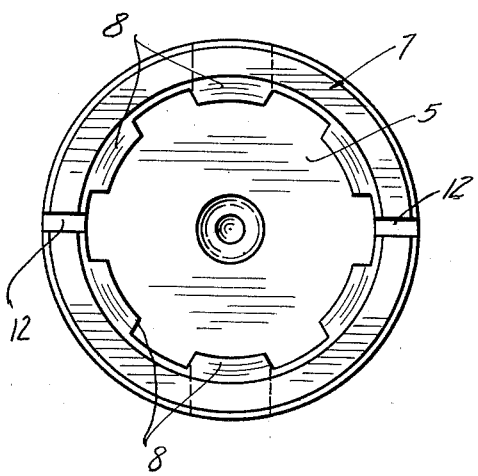
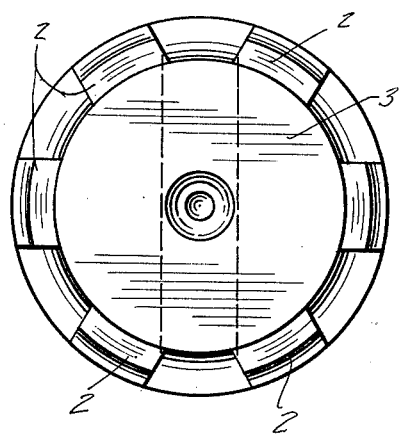
Inventor
Paul C. Green
By Merchant & Merchant
Attorney Patented Mar. 4, 1952

2,587,838

UNITED STATES PATENT OFFICE 2,587,838

SPLINE ADAPTER COUPLER

Paul C. Green, Aberdeen, S. Dak., assignor to Hub City Iron Company, Aberdeen, S. Dak., a corporation of South Dakota Application September 20, 1950, Serial No. 185,781

2 Claims. (Cl. 287—119)

My invention relates generally to improvements in coupling devices, and more specifically to spline-adapter couplings adapted to connect the splined power take-off shaft of a tractor or the like to an internally splined power shaft or knuckle on a power operated farm implement.

Until recently, tractors of different makes of manufacture were equipped with splined power take-off shafts of various diameters, in many instances, the diameter of a given power take-off shaft being smaller than that of the internally splined implement shaft or knuckle intended to be coupled thereto. An important object of my invention is, therefore, the provision of a splined adapter coupling which will permit driving of a power operated farm implement from the power take-off of a tractor when the power take-off shaft thereof is of a diameter different from that of the knuckle of the farm implement.

Another object of my invention is the provision of a spline adapter coupling which can be connected to the power take-off shaft of the tractor and to the internally splined knuckle of a farm implement with a minimum of effort and loss of time.

Another object of my invention is the provision of an adapter coupling as set forth which is relatively simple and inexpensive to manufacture, which is highly efficient in operation, and which is rugged in construction and durable in use.

Generally stated, the invention consists of the novel devices, combinations of devices, and arrangement of parts hereinafter described and defined in the claims.

In the accompanying drawings, like characters indicate like parts throughout the several views.

Referring to the drawings:

Fig. 1 is an axial section through my novel adapter coupling;

Fig. 2 is a view in end elevation as seen looking from the left to the right of Fig. 1; and Fig. 3 is a view in elevation of the opposite end of the structure of Figs. 1 and 2.

My novel adapter coupling comprises a shaft or body portion 1 having external splines 2 extending axially inwardly from one end 3 thereof, and other external splines 4 extending axially inwardly from the opposite end 5. The shaft 1 is provided intermediate its ends with an annular shoulder 6 closely adjacent the inner ends of the splines 2 and in axially inwardly spaced relation to the inner ends of the splines 4. It will be noted that the diameter of the splines 2 is greater than that of the splines 4. However, the relative diameters of the splines 2 and 4 may be varied according to the requirements in manufacture. A tubular sleeve 7 is provided with internal splines or teeth 8 and has one end portion 9 telescoped over the splined end 5 of the shaft 1 and in abutting engagement with the shoulder 6. As shown in Fig. 1, the splines 8 extend axially inwardly from the outer end portion 10 of the sleeve 7 and terminate in axially outwardly spaced relation to the inner ends of the splines 4 of the shaft 1. The splines 8 have meshing engagement with the splines 4, whereby to lock the sleeve 7 to the shaft 1 for common rotation. A pin or the like 11 extends transversely through the sleeve 7 and the end portion 5 of the shaft 1, whereby to positively lock the sleeve 7 against axial movements in a direction away from abutting engagement of the end portion 9 with the shoulder 6.

Several earlier models of tractors are equipped with splined power take-off shafts having a diameter of one and one-eighth inches (1⅛") and a great many power driven farm implements are equipped with tubular shafts or knuckles having a diameter of one and three-eights inches (1⅜"). For this reason, in the preferred embodiment of the invention illustrated, the diameter of the shaft 1 through the splines 2 is preferably of a size to fit a one and three-eighths inch (1⅜") knuckle, whereas the major internal diameter of the sleeve 7 is of a size to permit insertion thereinto of a one and one-eighth inch (1⅛") diameter power take-off shaft. A pair of diametrically opposed axially extending slots 12 in the sleeve 7 permit compensation for limited variations in the size of the power take-off shaft, and a pair of aligned openings 13 in the outer end portion 10 of the sleeve 7 are adapted to receive a nut-equipped clamping screw, not shown, but which would be utilized to lock a power take-off shaft within the sleeve 7 against axial slippage. I further provide a transverse opening 14 adjacent the end portion 3 of the shaft 1 and a circumferentially extended groove or channel 15 axially inwardly spaced therefrom, either of which may be used with suitable locking pins to prevent axial movement between the coupling 1 and the knuckle to which it may be attached.

I have found that a coupling adapter made in accordance with my invention, may be manufactured with greater ease and at a great savings in cost over an adapter which is forged from a single piece of material. The splines 2 and 4 in the shaft 1 are preferably cut in the usual manner by suitable milling cutters, and the internal splines 8 are relatively easily formed by broaching or the like.

My invention has been thoroughly tested and found to be completely satisfactory of the objectives set forth; and, while I have shown and described a preferred embodiment thereof, it will be understood that the same is capable of modification without departure from the spirit and scope of the invention as defined in the claims.

What I claim is:

1. A spline adapter coupling comprising a shaft having external splines extending axially inwardly from its opposite ends and an annular shoulder at its intermediate portion, a cooperating sleeve telescoped over one end portion of said shaft and abutting said shoulder, said sleeve having internal splines engaging the splines on said one end portion of the shaft, said internal splines extending axially outwardly of the adjacent end of said shaft to provide means for coupling to a splined element, and means positively locking said sleeve to said shaft against axial movements in a direction away from abutting engagement thereof with the shoulder of said shaft.

2. The structure defined in claim 1 in which the splines on the sleeve-engaged end of said shaft terminate in axially outwardly spaced relation to said shoulder and in which the internal splines on said sleeve terminate in spaced relationship to the shoulder-abutting end thereof and in axially outwardly spaced relation to the inner ends of the shaft splines engaged thereby.

PAUL C. GREEN.

REFERENCES CITED

The following references are of record in the file of this patent:

UNITED STATES PATENTS

| Number | Name | Date |
|---|---|---|
| 2,089,168 | Brown | Aug. 3, 1937 |
| 2,297,390 | Burger | Sept. 29, 1942 |
| 2,466,097 | Graue | Apr. 5, 1949 |
| 2,508,832 | McAnninch | May 23, 1950 |